US008769686B2

(12) United States Patent
Liu et al.

(10) Patent No.: US 8,769,686 B2
(45) Date of Patent: Jul. 1, 2014

(54) SYSTEM AND METHOD FOR SECURING WIRELESS TRANSMISSIONS

(75) Inventors: Tie Liu, College Station, TX (US); Yufei Blankenship, Kildeer, IL (US)

(73) Assignee: Futurewei Technologies, Inc., Plano, TX (US)

( * ) Notice: Subject to any disclaimer, the term of this patent is extended or adjusted under 35 U.S.C. 154(b) by 474 days.

(21) Appl. No.: 12/714,095

(22) Filed: Feb. 26, 2010

(65) Prior Publication Data

US 2011/0211696 A1 Sep. 1, 2011

(51) Int. Cl.
*G06F 12/14* (2006.01)
*H04L 9/32* (2006.01)
*H04K 1/00* (2006.01)

(52) U.S. Cl.
USPC .............................. 726/23; 713/168; 380/255

(58) Field of Classification Search
USPC .............................. 380/255; 713/168; 726/23
See application file for complete search history.

(56) References Cited

U.S. PATENT DOCUMENTS

| | | | | |
|---|---|---|---|---|
| 2002/0080719 | A1 | 6/2002 | Parkvall et al. | |
| 2005/0108615 | A1* | 5/2005 | An et al. | 714/776 |
| 2006/0062127 | A1 | 3/2006 | Burghardt et al. | |
| 2008/0130890 | A1* | 6/2008 | Rigler | 380/259 |
| 2008/0219447 | A1 | 9/2008 | McLaughlin | |
| 2008/0229103 | A1* | 9/2008 | Mutka et al. | 713/168 |
| 2010/0022184 | A1 | 1/2010 | Khoshnevis et al. | |
| 2010/0041389 | A1* | 2/2010 | Cave et al. | 455/423 |
| 2011/0134990 | A1* | 6/2011 | Tian et al. | 375/240 |
| 2011/0246854 | A1* | 10/2011 | McLaughlin et al. | 714/758 |

FOREIGN PATENT DOCUMENTS

| | | | |
|---|---|---|---|
| CA | 2156889 | A1 | 3/1996 |
| CN | 1428026 | A | 7/2003 |
| CN | 1925388 | A | 3/2007 |
| CN | 101594227 | A | 12/2009 |
| RU | 2117388 | C1 | 9/1995 |
| RU | 2110148 | C1 | 4/1998 |
| RU | 2377723 | C2 | 12/2009 |
| WO | 2007025998 | A2 | 3/2007 |
| WO | 2008036633 | A2 | 3/2008 |

OTHER PUBLICATIONS

Cai, N., et al., "Secure Network Coding," Feb. 29, 2008, pp. 1-23, Hong Kong, China.

Gopala, P. K., et al., "On the Secrecy Capacity of Fading Channels," Transactions on Information Theory, Oct. 2008, pp. 4687-4698, vol. 54, No. 10, IEEE.

International Search Report and Written Opinion received in Patent Cooperation Treaty Application No. PCT/CN2011/071167, mailed Jun. 2, 2011, 11 pages.

Wyner, A.D., "The Wire Tap Channel," The Bell System Technical Journal, vol. 54, No. 8, Oct. 1975, 17 pages.

(Continued)

*Primary Examiner* — Aravind Moorthy
(74) *Attorney, Agent, or Firm* — Slater & Matsil, L.L.P.

(57) ABSTRACT

A system and method for securing wireless transmissions is provided. A method for transmitting secure messages by a transmitter includes encoding a message with a secrecy code to produce L output codewords, where L is an integer value greater than one. The secrecy code includes a first security code and a second security code. The method also includes transmitting one of the L output codewords to a communications device when a channel quality of a channel between the transmitter and the communications device satisfies a criterion, and repeating the transmitting for any remaining L−1 output codewords.

25 Claims, 4 Drawing Sheets

(56) References Cited

OTHER PUBLICATIONS

Khisti, A., et al., "Secure Broadcasting Over Fading Channels", IEEE Transactions on Information Theory, vol. 54, No. 6, Jun. 2008, pp. 2453-2469.

Supplementary European Search Report received in European Patent Application 11746842.1, mailed Oct. 1, 2012, 9 pages.

European Office Action received in Application No. 11746842.1-1860, dated Jan. 30, 2014, 5 pages.

Russian Office Action received in Application No. 2012121704, mailed Dec. 23, 2013, 12 pages.

* cited by examiner

SYSTEM AND METHOD FOR SECURING WIRELESS TRANSMISSIONS

TECHNICAL FIELD

The present invention relates generally to wireless communications, and more particularly, to a system and method for securing wireless transmissions.

BACKGROUND

In general, securing transmitted information typically involves the application of a security technique to make it difficult, if not impossible, for an eavesdropper to detect the actual information content of a transmission made to a legitimate receiver. Normally, security may be provided in higher layers of a network, such as in an application layer, wherein a security application may be used to apply the security to the information content of the transmission prior to the actual transmission taking place. For example, the security application may be a program executed by a user who wishes to secure the transmission. Alternatively, the security application may be a hardware security unit that may be used to secure transmissions made by a transmitter used by the user.

However, the higher layer security techniques may usually require that a secret key(s) be shared by a transmitter (the user) and a receiver (the legitimate receiver). Sharing the secret key(s) may be problematic since the security of the security techniques may only be as good as the security present in the sharing of the secret key(s).

SUMMARY

These and other problems are generally solved or circumvented, and technical advantages are generally achieved, by embodiments of a system and method for securing wireless transmissions.

In accordance with an embodiment, a method for transmitting secure messages by a transmitter is provided. The method includes encoding a message with a secrecy code to produce L output codewords, where L is an integer greater than 1, transmitting one of the L output codewords to a communications device in response to determining that a channel quality of a channel between the transmitter and the communications device satisfies a criterion, and repeating the transmitting for any remaining L−1 output codewords. The secrecy code includes a first security code and a second security code.

In accordance with another embodiment, a method for receiver operation is provided. The method includes receiving a secure transmission that includes L vectors of received signals, where L is an integer greater than 1, and decoding a secure message from the L vectors of received signals. Each vector of received signals is received in a different transmission, and the decoding makes use of a secrecy code which comprises a first security code and a second security code.

In accordance with another embodiment, a transmitter is provided. The transmitter includes a scheduler coupled to a message input, a security unit coupled to the scheduler, a security code store coupled to the security unit, and a transmit circuit coupled to the security unit. The scheduler arranges a timing of transmissions of secure messages to a receiver. The scheduling of the timing is based on a channel quality of a channel between the transmitter and the receiver. The security unit encodes a message provided by the message input into L output codewords using a secrecy code, where L is an integer greater than 1. The secrecy code includes a first security code and a second security code. The security code store stores the secrecy code, and the transmit unit prepares an output codeword for transmission.

An advantage of an embodiment is that security may be achieved even when, on average, a channel between the transmitter and an eavesdropper is equivalent or even better than a channel between the transmitter and a legitimate receiver.

A further advantage of an embodiment is that by spreading information bits over multiple transmissions that are transmitted independently of each other, security may be maintained even if the eavesdropper intercepts up to a determined number of transmissions. The determined number of transmissions may be a design parameter of the security system and may be adjusted depending on desired security level, data rate, and so on.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

Figure 5:
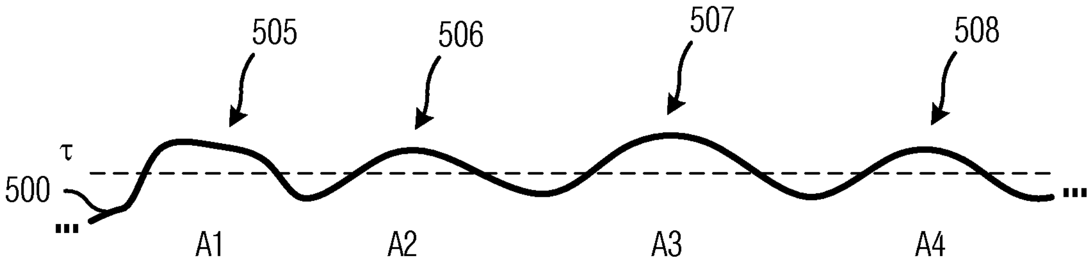
Figure 7:
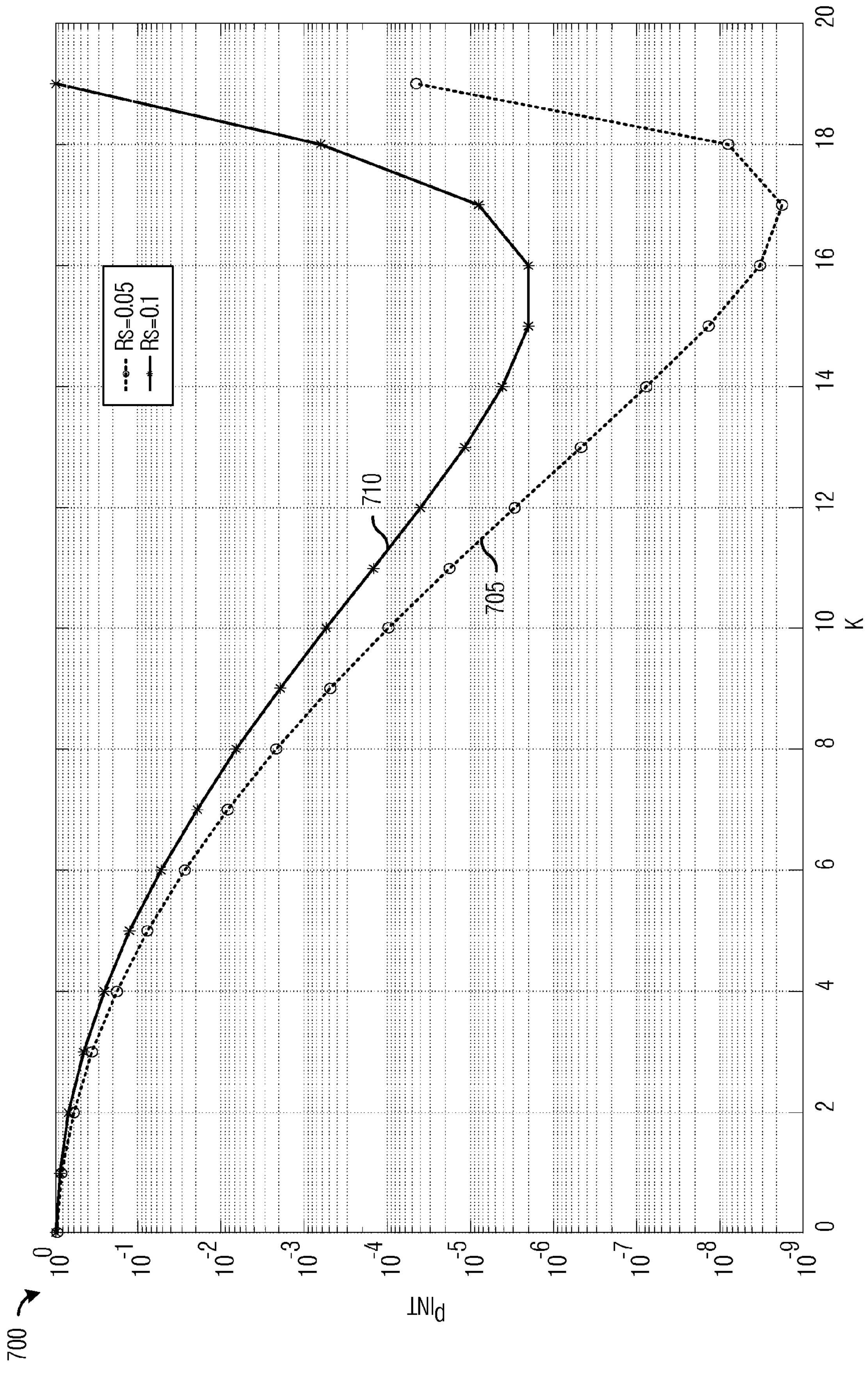

FIG. **3*a*** is a diagram of a portion of a transmitter with physical layer security;

FIG. **3*b*** is a diagram of a portion of a receiver with physical layer security;

FIG. **4*a*** is a flow diagram of transmitter operations in transmitting a secure message;

FIG. **4*b*** is a flow diagram of transmitter operations in transmitting the L segments of the secure message;

FIG. 5 is a diagram of a channel gain curve of a legitimate channel used to transmit multiple codewords of a single secure message;

FIG. **6*a*** is a flow diagram of receiver operations in receiving a secure message;

FIG. **6*b* is a flow diagram of receiver operations in providing channel quality information to a transmitter; and FIG. 7** is a plot of interception probability for a range of K for two different secrecy rates.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with multiple receivers, at least one of which is a legitimate receiver and at least one of which is an eavesdropper, such as a Third Generation Partnership Project Long Term Evolution (3GPP LTE) compliant communications system, a WiMAX compliant communications system, or so forth.

Figure 1:
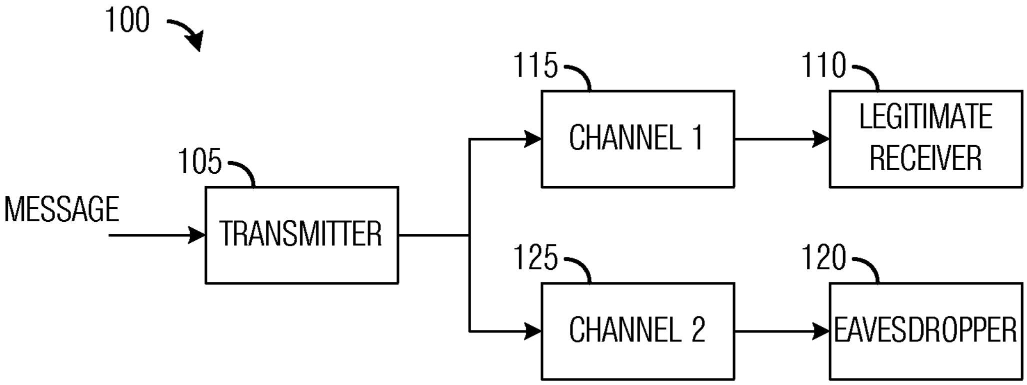
FIG. 1 is a diagram of a wiretap channel model.

FIG. 1 illustrates a wiretap channel model 100. Wiretap channel model 100 includes a transmitter 105 that transmits a message (information) to a legitimate receiver 110 over a first communications channel (channel 1) 115. However, due to a broadcast nature of wireless communications, an eavesdropper 120 may also receive the message over a second communications channel (channel 2) 125. First communications channel 115 may be referred to as a legitimate channel, while second communications channel 125 may be referred to as an eavesdropper channel.

Fading is a fundamental nature of wireless communications. Radios from multiple transmission paths add constructively or destructively at the receiver, leading to a time-varying channel, for example, when either a transmitter or a receiver is in motion. An often-adopted model in design and analysis is a so-called block fading model, in which the channel is assumed to be constant within each coherent period and changes independently from one coherent period to another.

In standard communications without secrecy constraints, fading may be very detrimental, particularly when channel state information (CSI) is not available at the transmitter. However, when CSI is known at the transmitter, CSI may be utilized to boost the performance of the communications.

According to an embodiment, a system and method for reducing an interception probability of wireless communications by exploiting the fading nature of a wireless channel and a transmitter's knowledge of a legitimate channel, e.g., channel 115, is provided.

Without loss of generality, the embodiments use assumptions including fading processes of the legitimate channel and the eavesdropper channels are independent of each other; and the transmitter has certain knowledge of the legitimate channel. As is usually the case, the transmitter is assumed to have no knowledge (except, potentially some statistical knowledge) of the eavesdropper channel.

Figure 2:
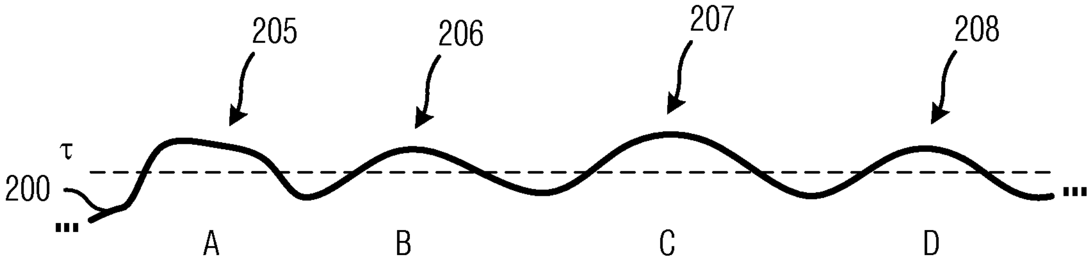
FIG. 2 is a diagram of a channel gain curve of a legitimate channel used to transmit multiple secure messages.

FIG. 2 illustrates a channel gain curve 200 of a legitimate channel used to transmit multiple secure messages. Channel gain may be an indicator of a channel's quality. As shown in FIG. 2, channel gain may vary, increasing and decreasing, over time. At certain times, such as times corresponding to peaks 205 through 208, channel gain curve 200 may exceed a threshold $\tau$ (shown as dashed line).

The threshold $\tau$ may be used to ensure that a transmission to the legitimate receiver occurs when the legitimate channel is at or near its peak quality. In general, if the quality of the legitimate channel is better than the quality of the eavesdropper channel when the transmission is made, secrecy codes may be used to protect transmission from being eavesdropped by the eavesdropper. On the other hand, if the quality of the legitimate channel is lower than the quality of the eavesdropper channel when the transmission is made, the eavesdropper may be able to intercept the transmission made on the legitimate channel. Since the transmitter may not have knowledge of the eavesdropper channel, the threshold $\tau$ may be set high to help ensure that the transmitter transmits only when quality of the legitimate channel is high and more likely to be better than the quality of the eavesdropper channel.

According to an embodiment, the transmitter may elect to transmit to the legitimate receiver only when the channel gain exceeds threshold $\tau$. Therefore, when the channel gain exceeds the threshold $\tau$, the transmitter may transmit a secure message to the legitimate receiver, and when the channel gain is below the threshold $\tau$, the transmitter may not transmit a secure message to the legitimate receiver. As shown in FIG. 2, the transmitter may transmit a different secure message to the legitimate receiver at an occurrence of each peak. However, the transmitter may transmit unsecure message to the legitimate receiver at any time, provided that the transmitter is permitted to transmit at that time. For example, peak 205 may be used to transmit secure message A, peak 206 may be used to transmit secure message B, and so forth. The different secure messages may be decoded as they are received at the legitimate receiver.

Suppose that a target secrecy rate is $R_s$ when the transmitter decides to transmit, and that a secrecy code is used. While any secrecy code may be used, a secrecy-capacity-achieving code is preferred. In general, a secrecy-capacity-achieving code may be a secrecy code optimized to achieve a highest possible secrecy rate. An example of a secrecy-capacity-achieving code may be a binning code with an appropriate codebook.

With the use of a secrecy-capacity-achieving code, the communications are secure if and only if $$\log\left(1+\frac{Pg_E}{N_0}\right) < \log\left(1+\frac{P\tau}{N_0}\right) - R_s, \tag{1}$$

where $g_E$ is the channel gain for the eavesdropper channel at the time of transmission, $N_0$ is the power of the background noise, and P is the transmit power. Thus, an interception probability $p_{INT}$ of the communications is expressible as $$p_{INT} = Pr\left(\log\left(1+\frac{Pg_E}{N_0}\right) \geq \log\left(1+\frac{P\tau}{N_0}\right) - R_s\right), \tag{2}$$

where the probability Pr(.) is evaluated over the distribution of $g_E$.

Equation (1) shows that the interception probability, i.e., the security of the overall transmission scheme, may be dependent on a channel realization of the eavesdropper channel at each transmission instance. Although the transmitter may employ a secrecy code at each transmission, the code design may rely on a strong assumption that the eavesdropper channel is of a certain quality, which may or may not be true at an instance of transmission. Thus, the uncertainty of the eavesdropper channel may limit the ability of the secrecy code to provide secrecy to occasions when Equation (1) is not satisfied, which may be unpredictable in nature. Therefore, the secrecy provided may be inadequate if $p_{INT}$ is not sufficiently small.

According to Equation (2), in order to reduce the interception probability, either the secrecy rate $R_s$ may be reduced or the threshold $\tau$ may be increased. However, increasing the threshold $\tau$ may reduce a transmission frequency since times when the channel quality exceeds the threshold $\tau$ may decrease, leading to a reduction in an overall secrecy rate.

Figure 3A:
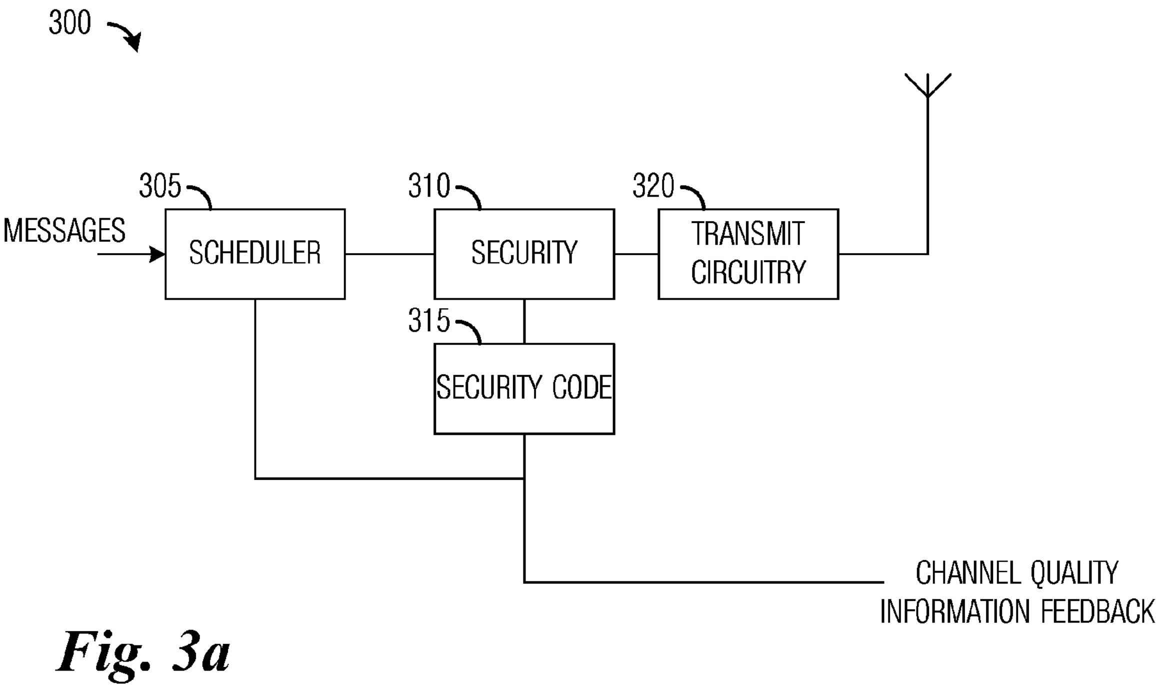

FIG. 3*a* illustrates a portion of a transmitter 300 with physical layer security. Messages, in the form of bits, symbols, or packets, for example, destined for a plurality of receivers served by transmitter 300 may be sent to a scheduler 305, which decides which message(s) to which receiver(s) should be transmitted in a given transmission opportunity. Messages for receivers selected to receive transmissions may be provided to a security unit 310 which may provide physical layer security by coding each of the messages using a secrecy code, where the secrecy code comprises a first security code and a second security code. A message is encoded into L segments of coded bits using a first security code and then each of the L segments of coded bits is encoded with a second security code, wherein the first and the second security codes used may be selected based on a desired security level for messages and/or receivers. Here L is an integer value greater than one.

The message may be encoded using the first security code to produce an intermediate secure codeword, which is partitioned into L segments of coded bits. One example of the first security code is a secure network code. In one embodiment, the first security code encodes the message with a sequence of bits $K_1$, which is not related to the message. The first security code generates the intermediate secure codeword based on a linear coding of the message and the sequence $K_1$. The bit sequence $K_1$ can be viewed as a type of secret key, intentionally inserted to provide randomness in the intermediate secure codeword and to confuse an eavesdropper. Preferably, sequence $K_1$ is randomly generated by the transmitter and not shared with any receiver. Sequence $K_1$ may be separately generated for each message, and not shared between messages, e.g., a unique $K_1$ may be generated for a message and used only in the coding of the message.

The L segments of coded bits (from the coding of the message by the first security code) may be coded using the second security code having a sufficient security to produce L output codewords. The L output codewords may then be transmitted over the wireless channel. Generally, the second security code encodes an i-th segment of coded bits with a sequence of bits $K_{2i}$ which is not related to the i-th segment of coded bits to produce an i-th output codeword, where i is an integer value, i=1, . . , L. Similar to sequence $K_1$, sequence $K_{2i}$ can be viewed as a type of secret key used by the second security code. Preferably, sequence $K_{2i}$ is randomly generated by the transmitter and not shared with any receiver. Sequence $K_{2i}$ may be separately generated for each segment of coded bits, and not shared between segments of coded bits, e.g., a unique $K_{2i}$ may be generated for a segment of coded bits and used only in the coding of the segment of coded bits.

The second security code generates the i-th output codeword based on a linear coding of the i-th segment of coded bits and the sequence $K_{2i}$. The code design guarantees that the entire message is secure against the eavesdropper as long as no more than K output codewords of the message are intercepted, where K and L are both integer values and K is less than or equal to L. According to an embodiment, each of the L output codewords may then be transmitted to a legitimate receiver when a channel gain of a channel to the legitimate receiver exceeds a threshold, threshold $\tau$, for example.

Generally, L may correspond to a number of transmissions over which each message is spread. L may be prespecified and may be based on factors such as a desired code rate, transmission latency, amount of information to be secured, available channel bandwidth, desired security level, and so forth. A discussion regarding the selection of the first and the second security code, L, and a variety of other security code parameters, such as K, is provided below. As an example, security unit 310 may use as the second security code, a binning code, to code each of the L segments of coded bits of the message to produce an output codeword. Alternatively, security unit 310 may use any other security codes (secrecy-capacity-achieving or even non-secrecy-capacity-achieving codes) to code each of the L segments of coded bits of the message. The first and the second security codes used by security unit 310 are also known at the legitimate receiver. The first and the second security codes used in security unit 310 may be stored in a security code store 315.

In addition to deciding which messages to which receivers should be transmitted, scheduler 305 may schedule the transmission of the L output codewords of the message based on channel state information (explicit or implicit) of the legitimate channel. According to an embodiment, the channel state information of the legitimate channel may be explicitly feedback by the legitimate receiver, either specifically for security purposes or part/all of feedback to be also used for other purposes, or implicitly known at the transmitter.

After the L codewords of the message have been secured and then scheduled, transmit circuitry 320 may be used to process the L output codewords for transmission. Operations performed by transmit circuitry 320 may include conversion to an analog representation of the selected codeword, filtering, amplifying, interleaving, coding and modulating, beam forming, and so forth. Some of the operations performed by transmitter 300, such as secrecy coding, beam forming, and so on, may make use of channel quality feedback information provided by receivers served by transmitter 300. The representation of the communications channel may also be used by scheduler 305 in its selection of the receivers.

Figure 3B:
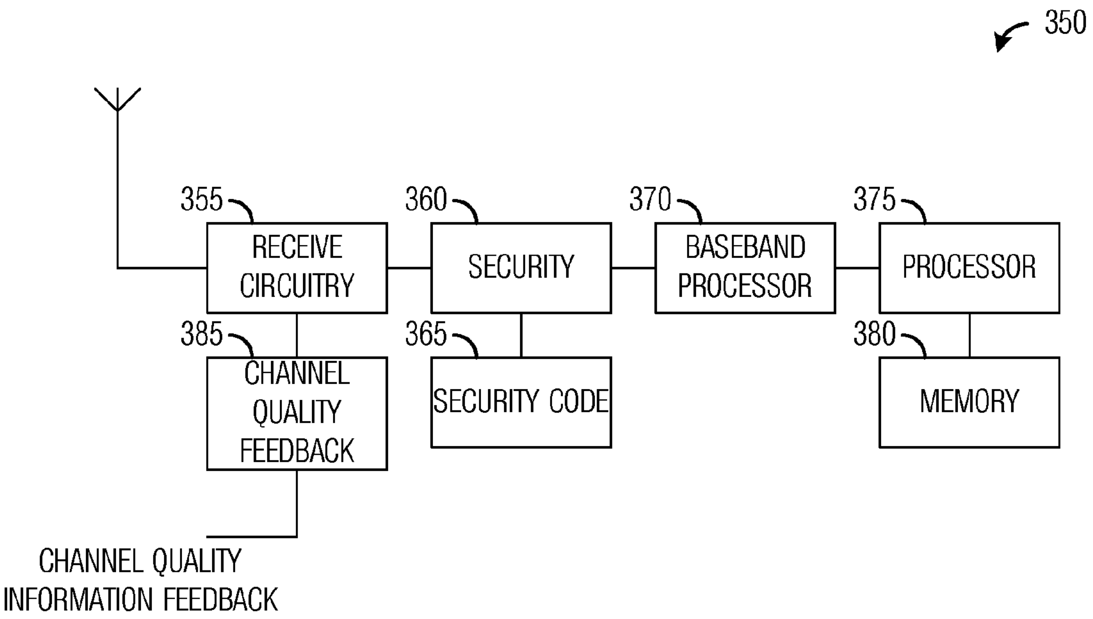

FIG. 3*b* illustrates a portion of a receiver 350 with physical layer security. Information transmitted by a transmitter may be received by receiver 350 by way of an antenna(s). Receiver 350 receives signals of a secure transmission from the transmitter as a vector of received signals. Receiver 350 may continue to receive signals until L secure transmissions have been received, resulting in L vectors of received signals which correspond to a message. The vector of received signals may be provided to receive circuitry 355, which may process the received information. According to an embodiment, receive circuitry 355 may wait until receiver 350 receives all L vectors of received signals of a message prior to proceeding with processing the received information. Alternatively, receive circuitry 355 may process each one of the L vectors of received signals as it is received, only stopping processing when reaching an operation that requires information contained in additional vectors of received signals of the message in order to proceed. Operations performed by receive circuitry 355 may include filtering, amplification, error detection and correction, modulation, analog-to-digital conversion, and so forth.

A security unit 360 decodes a secure message from the L vectors of received signals of the L secure transmissions, where the decoding makes use of a secrecy code comprising a first security code and a second security code. A security code store 365 may be used to store the first security code and the second security code. Security unit 360 may be used to convert (decode) the L vectors of received signals (after processing by receive circuitry 355) into estimates of L segments of coded bits. Each of the L segments of coded bits may have been secured by the transmitter using binning codes (or some other secrecy-capacity-achieving or non-secrecy-capacity-achieving codes), i.e., the second security code discussed previously. In other words, the receiver decodes a vector of received signals of a message into an estimate of a segment of coded bits using the second security code. Estimates of the L segments of coded bits may then be combined into an estimate of the intermediate secure codeword. The estimate of the intermediate secure codeword (decoded by security unit 360) may then be converted to an estimate of the original message using the first security code as discussed previously. The estimate of the original message may then be provided to a baseband processor 370 to provide final conversion into information that may be used by a processor 375. A memory 380 may be used to store the information, if necessary.

Corresponding to the second security code used in the transmitter, receiver 350 may generate an estimate of a segment of coded bits from a vector of received signals using a linear decoder. The receiver may also generate the estimate of the original message from the estimate of the intermediate secure codeword using a linear decoder corresponding to the first security code.

A channel quality feedback unit 385 may be used to provide information related to a communications channel between the transmitter and receiver 350, such as CSI, back to the transmitter. In general, the channel quality feedback unit 385 transmits a feedback message to the transmitter, where the feedback message comprises a security indicator, and the security indicator provides channel quality information. The information related to the communications channel may assist in the securing of information transmitted by transmitter 300 to receiver 350 as well as improve overall data transmission performance.

Figure 4A:
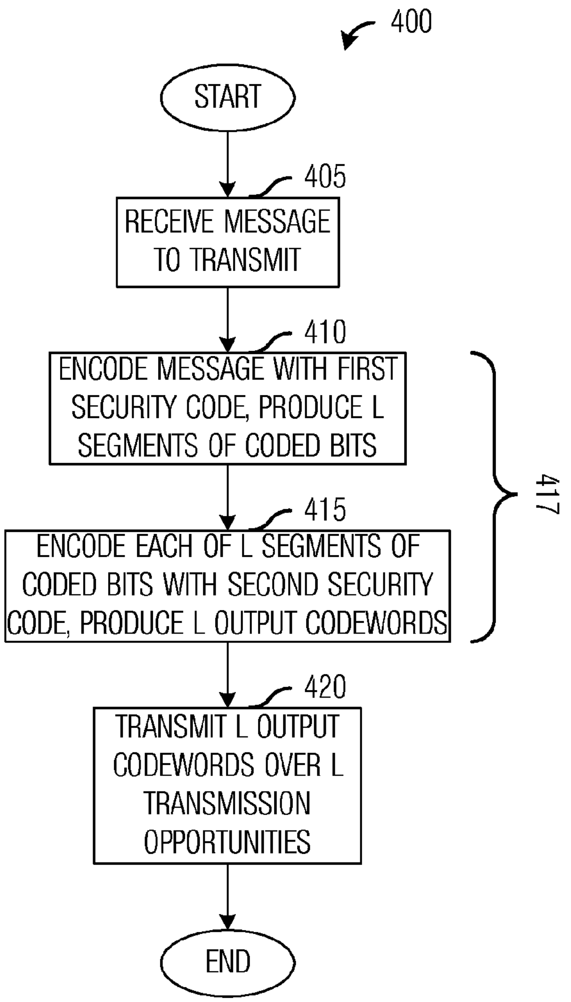

FIG. 4*a* illustrates a flow diagram of transmitter operations 400 in transmitting a secure message. Transmitter operations 400 may be indicative of operations taking place in a transmitter, such as transmitter 105, as it transmits a secure message(s) to a legitimate receiver, such as legitimate receiver 110. The secure message(s) transmitted by the transmitter may be secured using a secrecy code, where the secrecy code comprises a first security code and a second security code. As an example, the transmitter may employ a secure network code as the first security code. The second security codes may be binning codes or any other secrecy-capacity-achieving or non-secrecy-capacity-achieving codes. Transmitter operations 400 may occur while the transmitter is in a normal operating mode and while the transmitter has secure messages to transmit to the legitimate receiver.

Transmitter operations 400 may begin with the transmitter receiving a message to transmit, wherein the message is to be transmitted in a secure fashion (block 405). The message, for example, a security key(s), personal information, financial information, or so forth, may be provided by an application executing on an electronic device coupled to the transmitter, received in another message, retrieved from a memory or storage, or so forth.

The message may then be encoded using a first security code to produce L segments of coded bits (block 410). The encoding of the message with the first security code produces L individual segments of coded bits, where L is a non-negative integer value typically greater than one. The coding of the first security code may be such that a subset of the L individual segments of coded bits must be received prior to decoding at least a portion of the message. The use of the first security code may help to improve the overall security of the transmission of the message. Each of the L segments of coded bits may subsequently be encoded into a secure output codeword. The L output codewords are then transmitted to a receiver. Each code segment may be equal in size or they may be different in size. As an example, the transmitter may employ a secure network code as the first security code, which may allow the transmitter to spread the information bits contained in the message into L separate transmissions.

By encoding the message across multiple (e.g., L) segments of coded bits, it may be possible to select a first security code such that even if an eavesdropper intercepts up to a number of the transmissions (segments of coded bits), e.g., K, where K is a security parameter of the first security code and is a non-negative integer value less than or equal to L, the eavesdropper may not be able to decode any portion of the message. Contrasted with simply encoding the message for a single transmission, where the eavesdropper may be capable of decoding the message in its entirety if it is able to intercept the transmission, with encoding the message across multiple transmissions, the eavesdropper must intercept more than K transmissions before it may be able to decode any portion of the message.

A simple version of secure network coding considers the following secrecy communications scenario: the transmitter transmits L output codewords over L time instances, each of which has a rate R and can be received by the legitimate receiver without any error. The eavesdropper may receive at most K out of the L packets without being able to intercept any portion of the message. It may be shown that the maximum rate per packet at which the transmitter may securely communicate to the legitimate receiver is expressible as $$R_s = \frac{L-K}{L}R.$$

Furthermore, the secrecy rate of the communications may be achieved using a linear code to generate the L output codewords. The secrecy code may be referred to as a "K-out-of-L" secure code.

Let $R_s$ be the targeted secrecy rate when the transmitter decides to transmit with coding over L peaks. Then the use of the "K-out-of-L" secure code to encode the message will guarantee that as long as no more than K packets (or transmissions) are intercepted, the secure communications may achieve a rate of $R_s$ per packet (transmission).

The L segments of coded bits may be equal or substantially unequal in size. If a segment of coded bits is shorter than others, the segment of coded bits may be padded so that all of the segments of coded bits are equal in size. For example, the secure message may be partitioned into L segments of coded bits with each segment of coded bits being smaller in size than a data payload of a packet; the segments of coded bits may then be padded with additional information or null data to fill the data payload of a packet. According to an embodiment, the value of L may be set based on a number of factors, including a desired message latency, data transfer rate, desired security level, expected message size, and so forth. For example, a large value of L may increase the security of the secure message, however, message latency may also increase since a larger number of transmissions are needed to transmit the secure message in its entirety. Additionally, large values of L may decrease data transfer rate.

With the message encoded using the first security code to produce L segments of coded bits, the transmitter may then encode each of the L segments of coded bits using a second security code to produce L output codewords (block 415) and transmit the L output codewords of the secure message to the legitimate receiver, wherein the L output codewords are transmitted in L transmissions (block 420). Collectively, encoding the message with the first security code to produce L segments of coded bits (block 410) and encoding the L segments of coded bits with the second security code to produce L output codewords (block 415) may be referred to as encoding the message with a secrecy code (combination 417).

According to an embodiment, the transmitter may transmit each of the L output codewords one at a time to the legitimate receiver when the channel quality (e.g., channel gain) exceeds a threshold, such as threshold τ. Whenever the transmitter transmits to the legitimate receiver (when the channel gain is greater than the threshold, for example) using a security code (preferably a secrecy-capacity-achieving code), the communications occur at rate $$\frac{L}{L-K}R_s.$$

According to an embodiment, the threshold τ may be dynamically adjusted to meet secrecy rate requirements. For example, if the message is relatively short, the threshold may be increased to increase overall security at the expense of the secrecy rate. While, if the message is long, the threshold may be decreased to reduce overall security while increasing the secrecy rate.

Figure 4B:
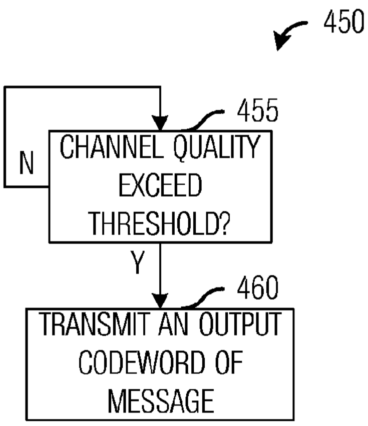

FIG. 4*b* illustrates a flow diagram of transmitter operations 450 in transmitting the L output codewords of the secure message. Transmitter operations 450 may begin with the transmitter performing a check to determine if the channel quality satisfies a criterion, e.g., the channel quality exceeds the threshold τ (block 455). According to an embodiment, the transmitter may determine if the channel quality exceeds the threshold τ by using feedback information provided by the legitimate receiver. For example, the legitimate receiver may feedback information that is explicitly used for security. The explicit security feedback may be as simple as a one-bit value regarding the channel quality. The legitimate receiver may feedback to the transmitter a "1" to indicate that the channel quality is greater than the threshold τ and a "0" to indicate that the channel quality is not greater than the threshold τ. If the channel quality exceeds the threshold τ, one of the L output codewords of the secure message may be transmitted (block 460).

According to an alternative embodiment, the transmitter may use feedback intended for other uses for security purposes. For example, in a 3GPP LTE compliant communications system, a channel quality indicator (CQI) may be feedback by user equipment (UE) periodically aperiodically to an eNB (a communications controller containing the transmitter) so that the eNB may make scheduling decisions. The CQI may also be utilized by the eNB to make a judgment similar to determining if the channel quality exceeds the threshold τ. As an example, the eNB may send a secure message only if the CQI is above a certain level.

According to another alternative embodiment, the transmitter may make use of implicit channel knowledge to determine if the channel quality exceeds the threshold. For example, channel quality knowledge may be available to the transmitter without feedback. In a time division duplexed (TDD) communications system, the eNB may be able to estimate the channel quality of a downlink channel based on an uplink sounding signal transmitted to the eNB by the legitimate receiver, taking advantage of channel reciprocity, for example.

FIG. 5 illustrates a channel gain curve 500 of a legitimate channel used to transmit multiple output codewords of a single message. Channel gain may be an indicator of a channel's quality. As shown in FIG. 5, channel gain curve 500 may vary, increasing and decreasing over time. At certain times, such as times corresponding to peaks 505 through 508, channel gain curve 500 may exceed a threshold τ (shown as dashed line). Each peak corresponds to a time when the transmitter may be able to transmit an output codeword of the secure message. For example, at peak 505 the transmitter may transmit a first output codeword of secure message A (shown as message A1), at peak 506 the transmitter may transmit a second output codeword of secure message A (shown as message A2), and so forth.

Referring back to FIG. 4*a*, after the transmitter has transmitted all L output codewords of the secure message, transmitter operations 400 may then terminate.

Figure 6A:
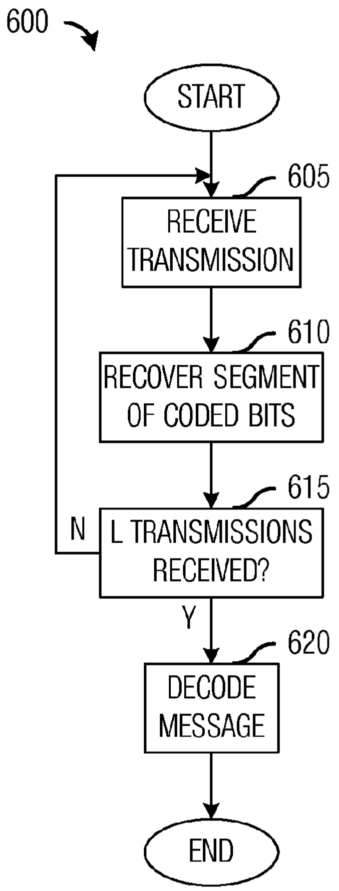

FIG. 6*a* illustrates a flow diagram of receiver operations 600 in receiving a secure message. Receiver operations 600 may be indicative of operations taking place in a receiver, such as legitimate receiver 110, as it receives a secured message(s) from a transmitter, such as transmitter 105. The secured message(s) received by the receiver may be secured using a secrecy code comprising a first security code and a second security code. The second security code may be a physical layer security code such as a binning code or any other secrecy-capacity-achieving or non-achieving code. Receiver operations 600 may occur while the receiver is in a normal operating mode and while the transmitter has secure messages to transmit to the receiver.

Receiver operations 600 may begin with the receiver receiving a transmission from the transmitter (block 605). As discussed previously, the transmitter may partition and encode a secure message into L output codewords to help increase the security of the secure message and then transmit one of the L output codewords each time that it transmits to the receiver. At the receiver, the receiver may need to wait until it has received all L output codewords of the secure message prior to attempting to decode the secure message.

After receiving each of the L output codewords, the receiver may recover a segment of coded bits from the received output codeword by decoding the received output codeword with the second security code (block 610). Then, the receiver may perform a check to determine if it has received all L output codewords of the secure message (block 615). If the receiver has not received all L output codewords of the secure message, then the receiver may return to block 605 to receive additional output codewords. Although the receiver may receive both secure messages and non-secure messages from the transmitter, the receiver knows which transmission belongs to the secure message, for example, by checking a flag in the transmission.

If the receiver has received all L output codewords of the secure message, then the receiver may combine the L segments of coded bits of the secure message into an intermediate secure codeword and then decode the intermediate secure codeword to obtain the original secure message (block 620). The receiver may make use of a decoder complementary to an encoder, which encoded the secure message into the intermediate secure codeword using a first security code, partitioned the intermediate secure codeword into L segments of coded bits, and then encoded each of the L segments of coded bits into an output codeword. Receiver operations 600 may then terminate.

Figure 6B:
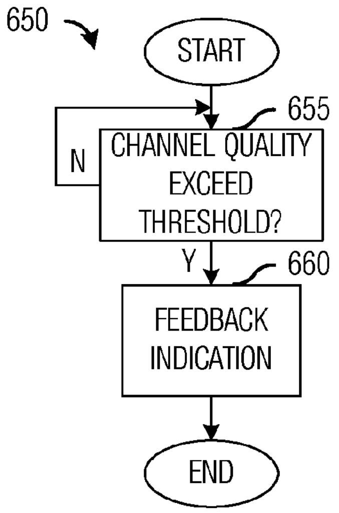

FIG. 6*b* illustrates a flow diagram of receiver operations 650 in providing channel quality information to a transmitter. Receiver operations 650 may be indicative of operations occurring in a receiver, such as legitimate receiver 110, as the receiver provides channel quality information to a transmitter, such as transmitter 105. Receiver operations 650 may occur while the receiver is in a normal operating mode and while the transmitter has secure messages to transmit to the receiver.

Receiver operations 650 may begin with the receiver performing a check to determine if the channel quality exceeds a threshold (block 655). For example, the receiver may check to determine if the channel gain exceeds the threshold. If the channel quality does not exceed the threshold, then the receiver may return to block 655 to repeat the check. If the channel quality does exceed the threshold, then the receiver may feedback an indicator to the transmitter; the indicator indicating that the channel quality does exceed the threshold (block 660).

The indicator may be feedback in a feedback message specifically intended for security use or the indicator may be included along with or combined with other feedback information. Receiver operations 650 may then terminate.

According to an alternative embodiment, the receiver feedbacks an indicator indicating the channel quality regardless of whether the channel feedback exceeds the threshold or not. For example, the indicator may be set to a first value to indicate that the channel quality exceeds the threshold and the indicator may be set to a second value to indicate that the channel quality does not exceed the threshold.

When a secrecy-capacity-achieving code is used to protect each data transmission, a probability that each transmission is intercepted may be given as:

$$p_0 = Pr\left(\log\left(1 + \frac{Pg_E}{N_0}\right) \geq \log\left(1 + \frac{P\tau}{N_0}\right) - \frac{L}{L-K}R_s\right). \quad (3)$$

The communications may become insecure when more than K data transmissions have been intercepted. Therefore, the interception probability $p_{INT}$ may be given as:

$$p_{INT} = \sum_{k=K+1}^{L} C_L^k p_0^k (1 - p_0)^{L-k}. \quad (4)$$

When K=0, no coding is performed across the different transmission opportunities corresponding to when the channel quality exceeds the threshold, and the interception probability $p_{INT}$ given in Equation (4) reduces to the case without the first security code, where a secure message is coded and transmitted for a single transmission opportunity. In general, a smaller interception probability may be obtained by optimizing over K.

FIG. 7 illustrates a data plot 700 of interception probability for a range of K for two different secrecy rates. A first curve 705 corresponds to interception probability for a secrecy rate of 0.05 bits/s/Hz and a second curve 710 corresponds to interception probability for a secrecy rate of 0.10 bits/s/Hz. Data for the curves were determined for a communications system where both the legitimate channel and the eavesdropper channel were assumed to be in Rayleigh fading, with an average received signal-to-noise ratio $P/N_0$ for the eavesdropper set at 0 dB. The threshold $\tau$ is 2, therefore an average received signal-to-noise ratio $P\tau/N_0$ for the legitimate receiver is about 3 dB. Furthermore, the probability of transmission is approximately 14 percent. Additionally, L was set to 20.

As shown in FIG. 7, by properly selecting an appropriate value for K, the technique disclosed in FIG. 4*a* (corresponding to values of K>0) may substantially reduce the probability of interception over the technique discussed in FIG. 2 (corresponding to K=0). For a given set of ($\tau$, $R_s$, K) as K increases, an actual transmission rate $$\frac{L}{L-K}R_s$$

increases, and $p_0$ increases according to Equation (3) for a given eavesdropper channel condition $g_E$. However, a larger value of K may also reduce the number of terms in the summation in Equation (4). Therefore, the parameters should be chosen properly to achieve maximum security, e.g., valleys of the curves shown in FIG. 7.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting secure messages by a transmitter, the method comprising:

encoding a message with a secrecy code to produce L output codewords, wherein the secrecy code comprises a first security code and a second security code, and L is an integer greater than 1, and wherein the first security code generates an intermediate secure codeword based on a linear coding of the message; and sequentially transmitting each of the L output codewords to a communications device during periods when a channel quality of a legitimate channel between the transmitter and the communications device exceeds a quality threshold, wherein none of the L output codewords are transmitted during periods when the channel quality of the legitimate channel fails to exceed the quality threshold, wherein periods when the channel quality exceeds the quality threshold have a lower probability of eavesdropping on the legitimate channel than periods when the channel quality fails to exceed the quality threshold.

2. The method of claim 1, wherein the first security code encodes the message into L segments of coded bits.

3. The method of claim 2, wherein the first security code encodes the message with a sequence of bits $K_1$ which is not related to the message.

4. The method of claim 3, wherein the first security code generates an intermediate secure codeword based on a linear coding of the message and the sequence $K_1$.

5. The method of claim 4, wherein the intermediate secure codeword is partitioned into the L segments of coded bits.

6. The method of claim 2, wherein the second security code encodes a segment of coded bits into an output codeword.

7. The method of claim 6, wherein the second security code encodes an i-th segment of coded bits with a sequence of bits $K_{2i}$, which is not related to the i-th segment of coded bits, where i is an integer value.

8. The method of claim 1, wherein the first security code comprises a secure network code.

9. The method of claim 1, wherein the second security code comprises a binning code.

10. The method of claim 1, further comprising receiving a feedback message from the communications device, wherein the feedback message comprises an indication regarding the channel quality.

11. The method of claim 1 further comprising determining when the channel quality exceeds the quality threshold based on a feedback signal received from the communications device.

12. The method of claim 11, wherein determining the channel quality comprises:

computing a reverse channel quality between the communications device and the transmitter; and determining the channel quality from the reverse channel quality.

13. The method of claim 1, wherein periods when the channel quality of the legitimate channel exceeds the quality threshold correspond to periods when a channel quality of a potential eavesdropping channel is too poor to intercept the output codewords, and wherein periods when the channel quality of the legitimate channel fails to exceed the quality threshold correspond to periods when a channel quality of a potential eavesdropping channel is adequate for intercepting the output codewords.

14. The method of claim 1, wherein periods when the channel quality exceeds the quality threshold correspond to periods when the channel quality of the legitimate channel is higher than that of a potential eavesdropping channel, and wherein periods when the channel quality fails to exceed the quality threshold correspond to periods when the channel quality of the legitimate channel is lower than or equal to that of the potential eavesdropping channel.

15. A transmitter comprising:

a scheduler coupled to a message input, the scheduler configured to schedule transmissions of secure messages to a receiver only when a channel quality of a legitimate channel between the transmitter and the receiver exceeds a quality threshold, wherein eavesdropping on the legitimate channel is less likely during periods when the channel quality exceeds the quality threshold than during periods when the channel quality fails to exceed the quality threshold;

a security unit coupled to the scheduler, the security unit configured to encode a message provided by the message input into L output codewords using a secrecy code, where L is an integer greater than 1, wherein the secrecy code comprises a first security code and a second security code, and wherein the first security code generates an intermediate secure codeword based on a linear coding of the message;

a security code store coupled to the security unit, the security code store configured to store the secrecy code; and a transmit circuit coupled to the security unit, the transmit unit configured to prepare an output codeword for transmission.

16. The transmitter of claim 15, wherein the first security code generates an intermediate secure codeword based on a linear coding of the message and a sequence of bits not related to the message.

17. The transmitter of claim 16, wherein the second security code encodes a segment of the intermediate secure codeword into an output codeword.

18. The transmitter of claim 15, wherein periods when the channel quality exceeds the quality threshold correspond to periods when the channel quality of the legitimate channel is higher than that of a potential eavesdropping channel, and wherein periods when the channel quality fails to exceed the quality threshold correspond to periods when the channel quality of the legitimate channel is lower than or equal to that of the potential eavesdropping channel.

19. A communications device comprising:

a processor; and a non-transitory computer readable storage medium storing programming for execution by the processor, the programming including instructions to:

receive a plurality of L vectors of a secure message over a legitimate channel between a transmitter and the communications device, where L is an integer greater than 1, wherein each of the L vectors are received during one of a plurality of periods when a channel quality of the legitimate channel exceeds a quality threshold, wherein periods when the channel quality exceeds the quality threshold have a lower probability of eavesdropping on the legitimate channel than periods when the channel quality fails to exceed the quality threshold; and decode the secure message from the L vectors of the secure message using a secrecy code, the secrecy code comprising a first security code and a second security code, and wherein the first security code generates an intermediate secure codeword based on a linear coding of the message.

20. The communications device of claim 19, wherein the instructions to decode the secure message comprise instructions to:

generate an intermediate secure codeword from the L vectors of received signals based on the second security code; and produce the secure message from the intermediate secure codeword based on the first security code.

21. The communications device of claim 20, wherein the instruction to generate an intermediate secure codeword comprise instructions to:

decode each of the L vectors of the secure message using the second security code to generate L segments of coded bits from the L vectors of the secure message; and combine the L segments of coded bits into the intermediate secure codeword.

22. The communications device of claim 19, wherein the programming further includes instructions to:

transmit a feedback message comprising a security indicator to the transmitter, wherein the security indicator provides channel quality information.

23. The communications device of claim 19, wherein no portions of the secure message are received during periods when the channel quality of the legitimate channel fails to exceed a quality threshold.

24. The communications device of claim 19, wherein the periods when the channel quality of the legitimate channel exceeds the quality threshold correspond to periods when a channel quality of a potential eavesdropping channel is too poor to intercept the output codewords, and wherein the periods when the channel quality of the legitimate channel fails to exceed the quality threshold correspond to periods when a channel quality of a potential eavesdropping channel is adequate for intercepting the output codewords.

25. The communications device of claim 19, wherein periods when the channel quality exceeds the quality threshold correspond to periods when the channel quality of the legitimate channel is higher than that of a potential eavesdropping channel, and wherein periods when the channel quality fails to exceed the quality threshold correspond to periods when the channel quality of the legitimate channel is lower than or equal to that of the potential eavesdropping channel.

* * * * *